United States Patent
Keller

(10) Patent No.: US 8,979,051 B2
(45) Date of Patent: Mar. 17, 2015

(54) SHAFT CLAMP

(76) Inventor: Brian K. Keller, Marengo, IL (US)

(*) Notice: Subject to any disclaimer, the term of this patent is extended or adjusted under 35 U.S.C. 154(b) by 269 days.

(21) Appl. No.: 13/286,290

(22) Filed: Nov. 1, 2011

(65) Prior Publication Data

US 2012/0102685 A1    May 3, 2012

Related U.S. Application Data

(60) Provisional application No. 61/409,364, filed on Nov. 2, 2010.

(51) Int. Cl.
*A47B 96/06* (2006.01)
*F16B 2/10* (2006.01)

(52) U.S. Cl.
CPC ........................................ *F16B 2/10* (2013.01)
USPC ..................................................... 248/230.5

(58) Field of Classification Search
USPC .......... 248/316.5, 316.6, 228.4, 228.5, 230.4, 248/230.5, 231.51, 231.61; 269/86, 91, 97, 269/104, 189, 203, 237, 240, 246, 249, 252, 269/257, 258, 262, 43, 45, 109; 24/282, 24/284, 285, 514
See application file for complete search history.

(56) References Cited

U.S. PATENT DOCUMENTS

| | | | | |
|---|---|---|---|---|
| 1,504,964 A * | 8/1924 | Newland | ........................ | 81/90.8 |
| 3,084,893 A * | 4/1963 | Ruth | ........................ | 248/228.4 |
| 3,203,421 A * | 8/1965 | Bialick | ........................ | 128/885 |
| 3,920,232 A * | 11/1975 | Clark | ............................. | 269/25 |
| 4,327,608 A * | 5/1982 | Keys | ..................................... | 81/4 |
| 4,483,059 A * | 11/1984 | Dearman | ........................ | 29/272 |
| 4,673,174 A * | 6/1987 | Tabbert | ............................ | 269/41 |
| 4,747,588 A * | 5/1988 | Dillhoff | ............................ | 269/6 |
| 4,799,639 A * | 1/1989 | Riley | ........................ | 248/228.4 |
| 5,462,246 A * | 10/1995 | Schlenker | ........................ | 248/49 |
| 5,529,297 A * | 6/1996 | Sawdon | ........................ | 269/239 |
| 5,758,870 A * | 6/1998 | Weaver | ........................ | 269/329 |
| 6,450,465 B1* | 9/2002 | Eslick | ........................ | 248/230.4 |
| 7,254,895 B1* | 8/2007 | O'Donnell | ...................... | 33/293 |
| 7,926,771 B2* | 4/2011 | Demartine et al. | ......... | 248/218.4 |
| 8,085,481 B2* | 12/2011 | Hill | ................................ | 359/818 |
| 2005/0035249 A1* | 2/2005 | Busuito | ........................ | 248/215 |

FOREIGN PATENT DOCUMENTS

BE    859904 A *  2/1978   ............. B29C 65/20

* cited by examiner

*Primary Examiner* — Alfred J Wujciak
(74) *Attorney, Agent, or Firm* — Bishop Diehl & Lee, Ltd.

(57) ABSTRACT

A shaft clamp having a first clamp member and a second clamp member, each having a main body shaped to allow positioning of the clamp member about a shaft and engagement of a shaft by a surface of the main body, is disclosed. The two clamp members are pivotably connected together at adjoining ends and separable at free ends, much like a clam shell configuration. A locking mechanism engagable with the free ends of the first and second clamp members is used to secure and pull the free ends of the clamp members to one another as they are positioned about a shaft. Alternatively, a torque-assisting extension connected to at least one of either the first member or the second member may be included. The extension allows the shaft clamp to be rotated, moved, or otherwise maneuvered more easily as it is secured about a shaft.

7 Claims, 7 Drawing Sheets

SHAFT CLAMP

RELATED APPLICATION

This application claims priority of and incorporates by reference Provisional Application No. 61/409,364, titled "Shaft Clamp" and filed on Nov. 2, 2010.

TECHNICAL FIELD OF THE INVENTION

The present device relates to a clamp for use with large cylinders. Particularly, the present device relates to a clamp used in assembly, maintenance and repair of pneumatic cylinders, such as those used to move elevators.

BACKGROUND OF THE INVENTION

In order to work on, move, install, repair or otherwise handle large shafts, such as those used in the support in movement of elevators, it is necessary to secure the heavy and typically smooth-surfaced cylinder to prevent damage and injury. Riggings using straps, hoses, chain and the like are common tools for such operations. Unfortunately, these shafts may come in a variety of diameters, and some may have tapered surfaces with continually narrowing profiles. Accordingly, it can be increasingly difficult to provide a single tool or rigging capable of safely handling the range of variations.

However, the present invention provides a single clamp which is capable of attaching to most any large diameter shaft with only a few minor adjustments. The present clamp solves these any other related problems associated with the tools and methods used by those skilled in the art.

SUMMARY OF THE INVENTION

A shaft clamp used to secure and rotate a large mechanical shaft, such as used in an elevator, is described.

In an embodiment, the disclosed shaft clamp comprises a first clamp member and a second clamp member, each having a main body shaped to allow positioning of the clamp member about a shaft and engagement of a shaft by a surface of the main body. The two clamp members are pivotably connected together at adjoining ends and separable at free ends, much like a clam shell configuration. The embodiment also includes a locking mechanism engagable with the free ends of the first and second clamp members to secure and pull the free ends of the clamp members to one another as they are positioned about a shaft.

In other embodiments, a torque-assisting extension connected to at least one of either the first member or the second member may be included. The extension allows the shaft clamp to be rotated, moved, or otherwise maneuvered more easily as it is secured about a shaft.

In an embodiment, the locking mechanism comprises a rod and two adjustable members which bias against the free ends of the clamp members. Preferably, the rod comprises an outer threaded surface and the adjustable members comprise a compatible inner threaded surface which allows them to be moved along the threaded rod. An adapter for engaging both a free end of the clamp member and an adjustable member may be used.

In still another embodiment, the pivotable connection between the adjoining ends of the first and second members is adjustable to allow a greater separation between the engagement surfaces. Preferably, the adjustability is provided by extended flanges or the like on the adjoining ends with distinct adjustment points, such as bolt holes, for example.

Any of the disclosed embodiments may include an engagement surface insert attachable to at least one of the engagement surfaces. The use of insert(s) allows the defined circumference of the clamp members to be reduced to more properly engage a particular shaft.

These and other embodiments are described and illustrated herein in such detail that those skilled in the art would understand how to make and use such embodiments without undue experimentation.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF PREFERRED EMBODIMENTS

Figure 1:
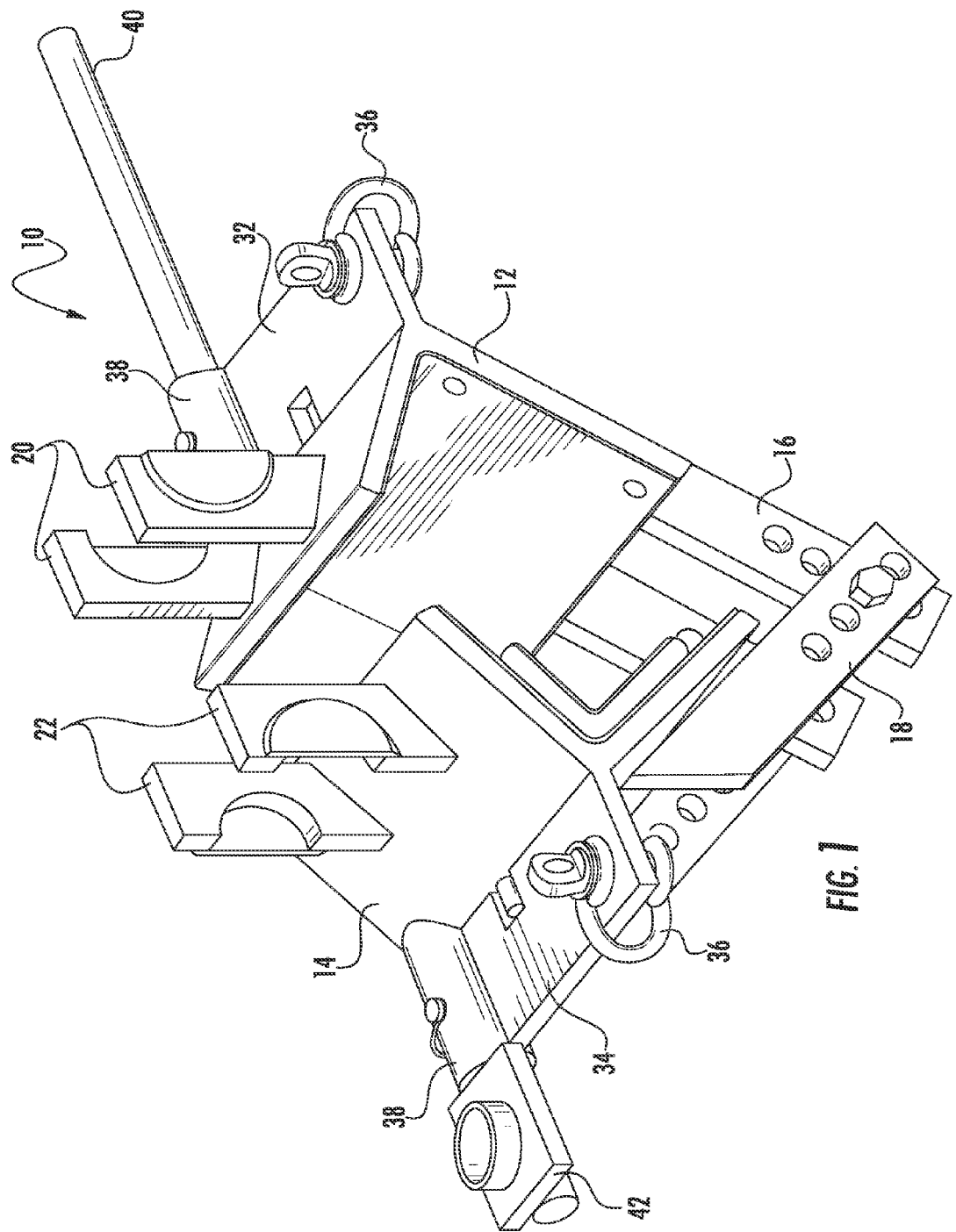
FIG. 1 is a perspective view of an embodiment of the present clamp device.
Figure 2:
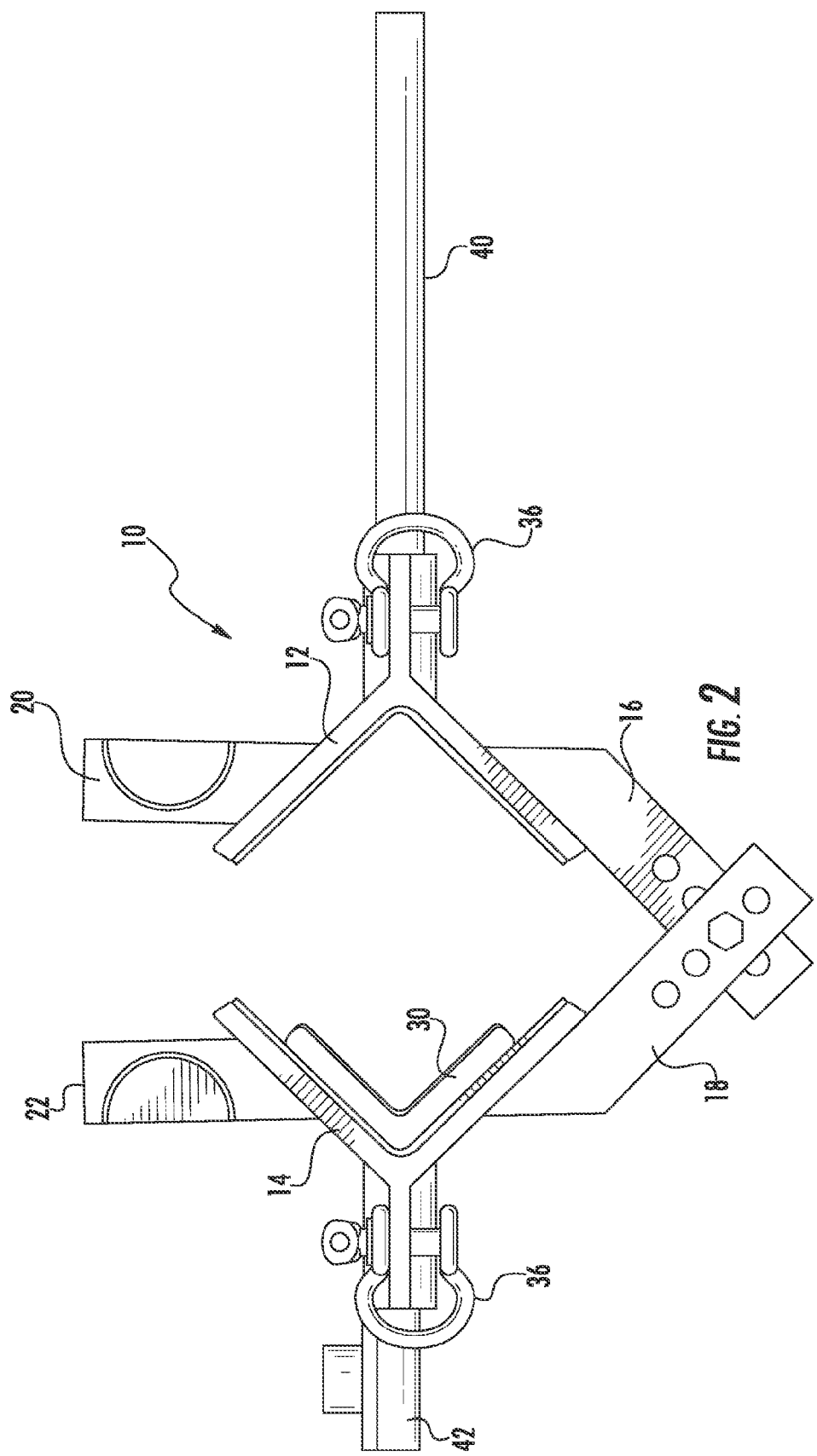
FIG. 2 is a top view of an embodiment of the present clamp device in an open position.
Figure 3:
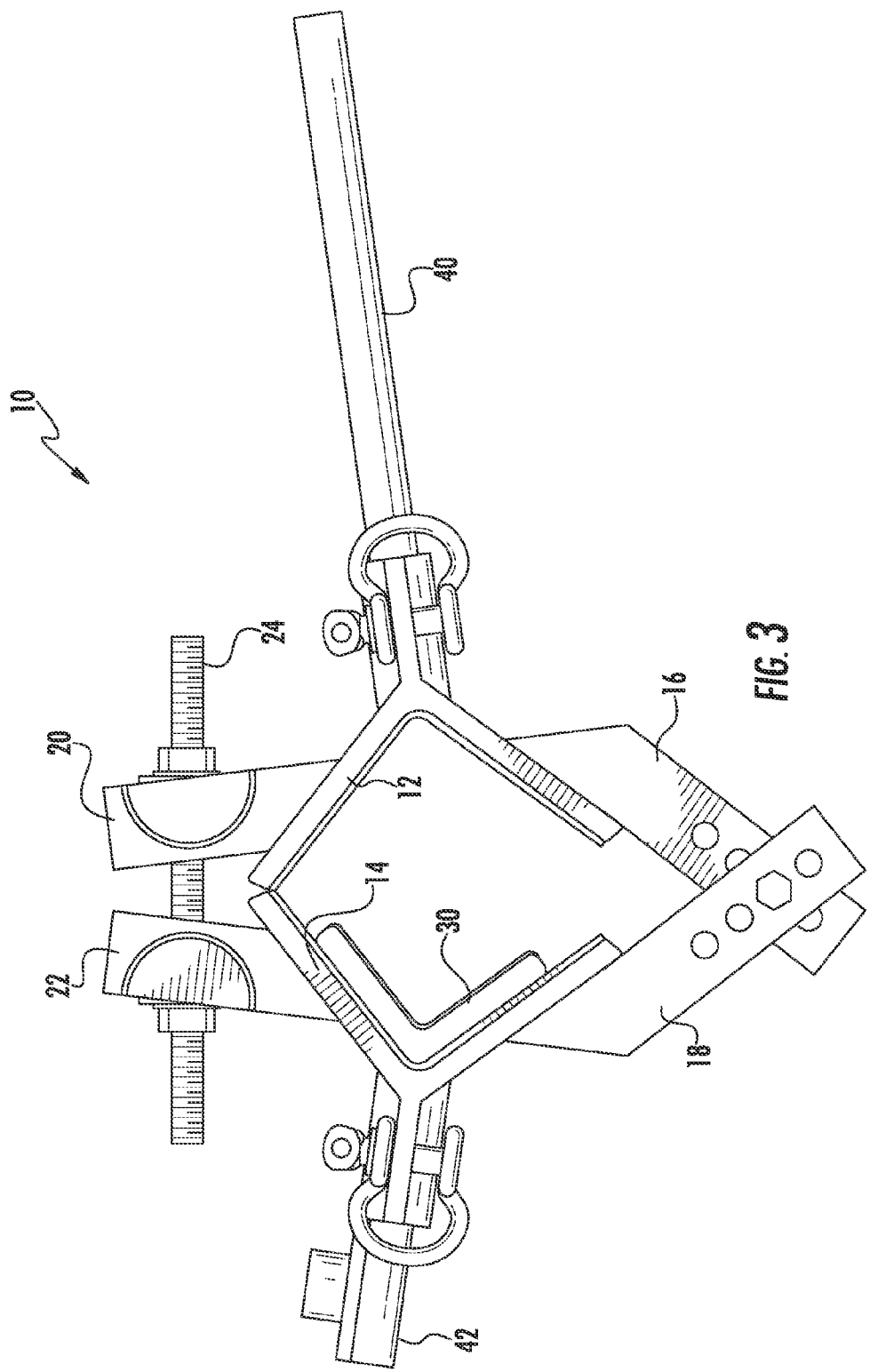
FIG. 3 is a top view of an embodiment of the present clamp device in a closed position.
Figure 4:
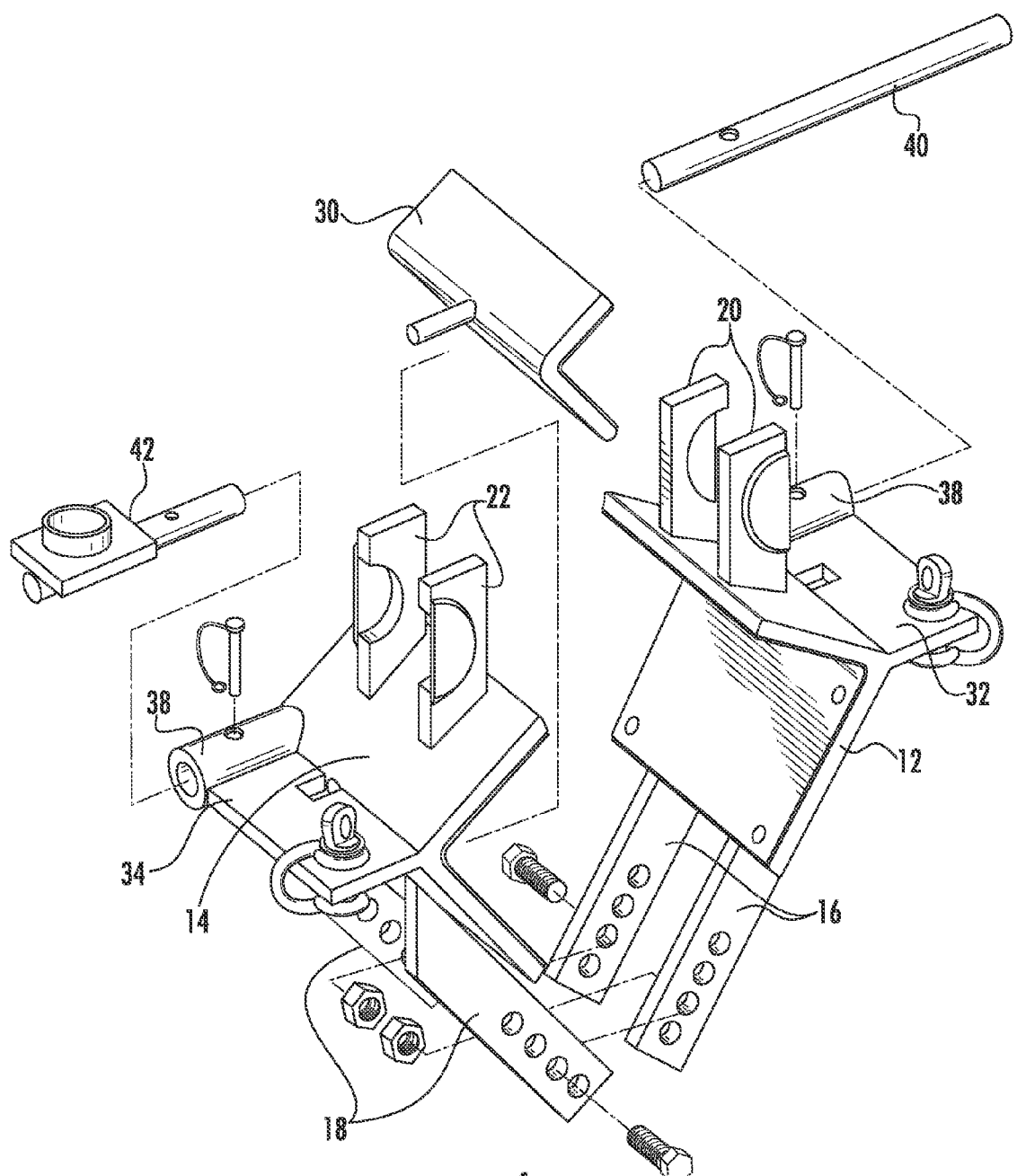
FIG. 4 is an exploded view of an embodiment of the present clamp.

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to embodiments illustrated.

Referring to FIGS. 1-7, there is illustrated a shaft clamp, generally designated by the numeral 10. The clamp 10 has two substantially identical halves, i.e., clamp members, bolted together at adjoining ends in a manner which allows the free ends of the two clamp members to pivot between an open position and a closed position, with a number of intermediate positions. A latching mechanism is used to secure and pull the free ends of the clamp members to one another. Positioned between the clamp member pivot and the latching mechanism are two large Y-shaped main bodies 12, 14 which define an interior circumference and move toward and away from one another to alter that circumference. It is these two components which provide engagement with a shaft.

The expanse of the clamping surfaces may be almost any size, provided when secured to a shaft a sufficient surface area contacts the shaft. The clamp 10 may be manufactured in a variety of sizes, much like many adjustable hand tools are today. For example, a 12-inch clamp may be suitable for use on a shaft from between about 8 to about 15 inches in diameter and an 18-inch clamp for 15-22 inches diameter shafts. The adjustability of the clamp may be greater or less.

As can be seen from an illustration of a preferred embodiment, each bolted end includes two metal connecting flanges 16, 18 with multiple holes (four in each flange are shown). The connecting flanges are arranged in pairs in a crossing fashion and a corresponding hole from each is aligned. Once properly aligned, a suitable fastener, e.g., a nut/bolt/washer assembly, is secured into each pair of holes to maintain the two clamp members in a pivoting relationship. By changing the aligned holes on the paired connecting flanges, the pivot point of the clamp 10 is adjustable. By changing the pivoting point, the clamping circumference may be similarly altered.

Looking at the opposite, opening and closing free ends of the clamp members, the latching mechanism can be more readily understood. Here, four additional extending flanges 20, 22 are positioned. These flanges are preferably aligned to abut edges, as shown. On an inside surface of each locking flange is a notch, semi-circular notches are shown.

Figure 5:
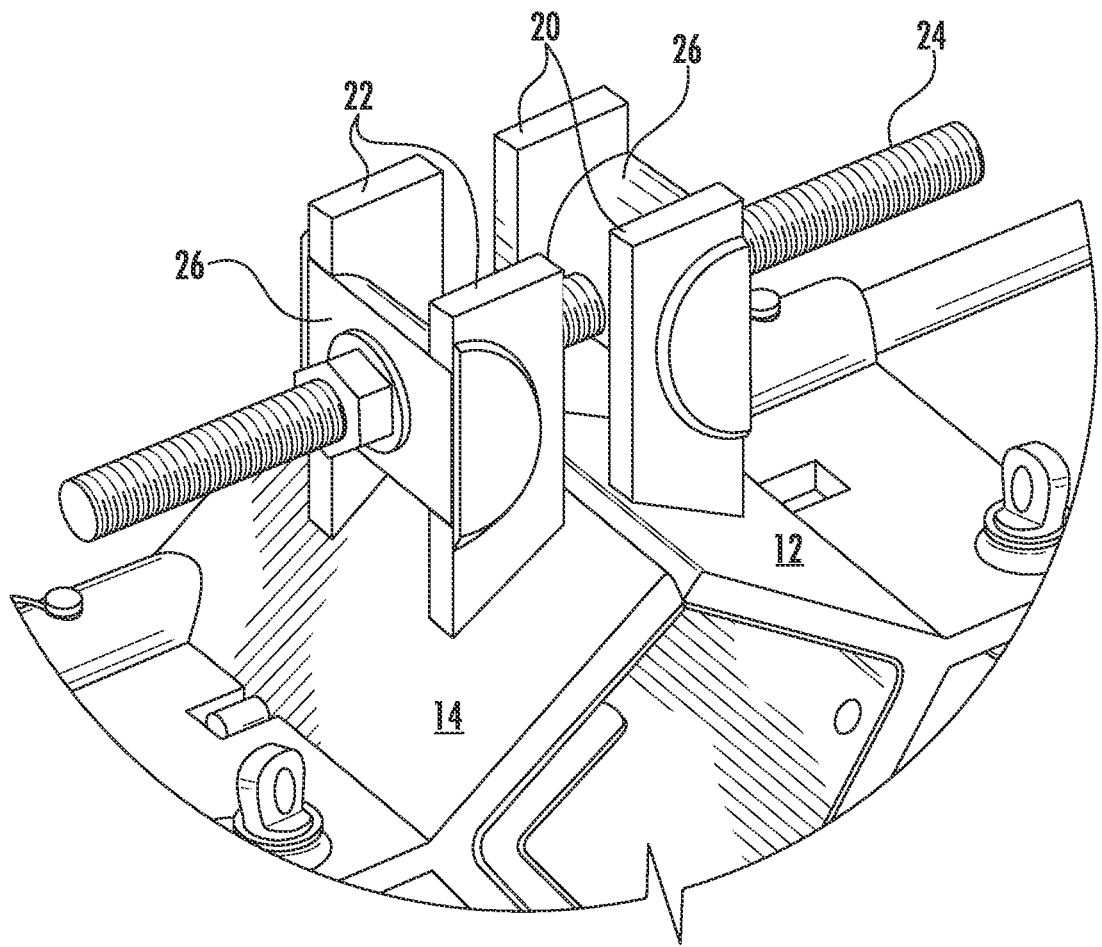
FIG. 5 is a partial view showing an embodiment of a locking bar used in the present clamp device.

As shown in FIG. 5, a large threaded shaft 24 with a nut, washer and a half-cylinder shaped latching component 26 at each end attaches to the open end of the two pivoting halves of the clamp to secure it closed. That is, the half-cylinder shaped latching components are seated within the semi-circular notches, then the nuts are tightened on each end to bias the free ends together and hold the semi-cylinders in place.

The interior surfaces of each clamp member (i.e., the arms of the Y) is preferably fully or partially lined with a durable material which has good slip-resistance against steel. Preferably, the surfaces are lined with a thick (about 1-10 mm) leather or leather-like material.

Figure 7:
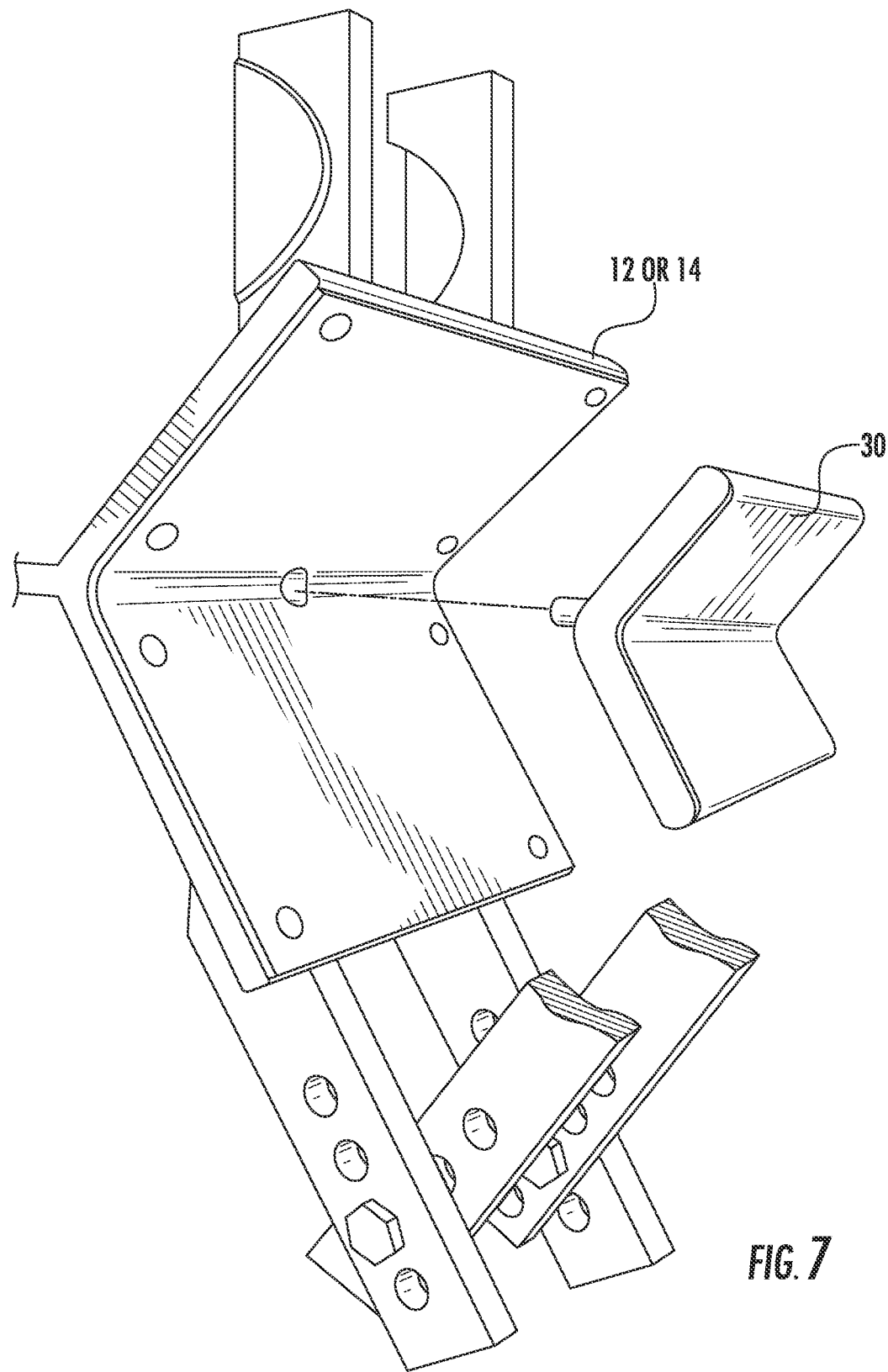
FIG. 7 is a partial view of an embodiment of an interior surface of the present clamping surface and insert.

As shown in FIG. 7, another method for altering the clamping width of the clamp is through the use of clamp inserts 30. One or two inserts (smaller V-shaped components), which may also include a layer of leather or leather-like material, attach within the clamp members via a small opening in each clamp member, though other attachment options exist. The purpose of the inserts is to reduce the minimum clamping diameter of the clamp. They may also be used for irregular-shaped shafts, as would be understood by one of skill in the art.

Figure 6:
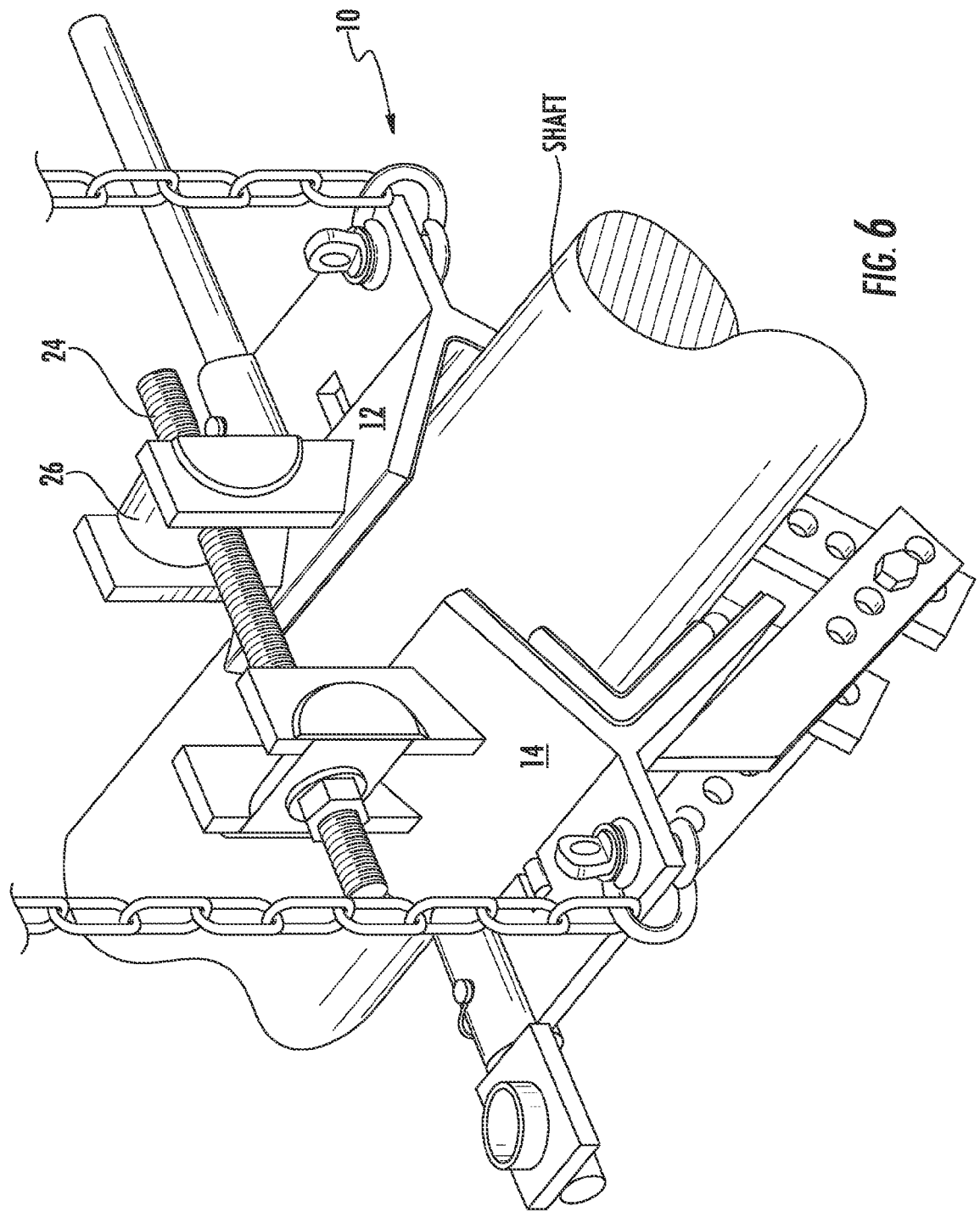
FIG. 6 is a perspective of an embodiment of the present clamp engaged with a shaft.

The back flanges 32, 34 of the clamping surfaces (i.e., the stem of the Y) may include a chain shackle 36 bolted to each. The chain shackle 36 is used to attach, for example, a support chain (FIG. 6). A torque device coupler 38 may also be fixed onto one or both of the back flanges 32, 34. The coupler 38 is preferably a sleeve into which the torque device may be detachably secured. As shown, the coupler 38 has a hole into which a pin may be inserted to lock the torque device in place.

There are two illustrated torque devices shown in the appended drawings. The first is a long rod 40 which locks into the coupler 38 by one end. The rod 40 extends tangentially from the secured clamp and allows a user to grip and turn the clamp, thereby rotating the secured shaft. The second torque device is a short rod with an impact adapter 42. This device also locks into the coupler 38 by one end. The adapter end is configured to permit the insertion of, for example, an impact tool. Operation of the impact tool also creates the desired rotation of the shaft. Other torque generating tools may also be adapted to attach to the present clamp without undue experimentation.

The components of the clamp are preferably made from steel plate, from about one-fourth inch to about one inch thick plate preferred, and steel rod, about half inch to about three inch diameter. Obviously, larger and smaller plate and rod sizes are possible. The hardware to be used is preferably SAE grade 5 or stronger.

In use, the pivot point of the clamp 10 should first be set and checked to create the most desirable clamping circumference between the engaging surfaces of the main bodies. This can be readily determined by one of skill in the art. Once the pivot point is set, the clamp 10 can be opened and positioned to close about the desired shaft, inserting the threaded locking shaft at the open end by properly seating each of the half-cylinder shaped latches within the notches of the locking flanges. The nut on each end of the threaded locking shaft should be adequately tightened. A torque device can then be attached to one or both of the torque device couplers. Torque may now be applied to the clamp to turn the shaft. Also, support chains may be linked to the shackle attached to each half of the clamp when necessary.

Once the shaft has been moved or repaired, as necessary, the chains may be removed and the threaded locking rod removed by loosening the end nuts and unseating the latches. The clamp may then be opened and removed.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A shaft clamp comprising:
   first and second clamp members which are pivotably connected together at adjoining ends and separable at free ends, each clamp member having a Y-shaped main body formed of two flat arm sections and a single base section, the arm sections being angled relative to one another to allow positioning of the first and second clamp members to engage a shaft;
   a locking mechanism positioned proximate the free ends of the first and second clamp members to secure and pull the free ends of the clamp members to one another;
   an engagement surface on an interior surface of each flat arm section of the Y-shaped main body of the first and second clamp members; and
   a torque-assisting extension connected to at least one of either the first clamp member or the second clamp member, the torque-assisting extension comprising a detachable pneumatic tool adapter.

2. The shaft clamp of claim 1, further comprising at least one shackle secured to at least one of either the first and second clamp members for connecting the shaft clamp to a support chain.

3. The shaft clamp of claim 1, wherein the torque-assisting extension comprises a rod detachably connected to one of either the first clamp member or the second clamp member.

4. The shaft clamp of claim 1, wherein the pivotably connected adjoining ends of the first and second clamp members are adjustable to allow a greater separation between the engagement surfaces.

5. The shaft clamp of claim 1, wherein each of the engagement surfaces comprises an outer surface, at least in part, of leather.

6. A shaft clamp comprising:
   first and second clamp members which are pivotably connected together at adjoining ends and separable at free ends, each clamp member having a Y-shaped main body formed of two flat arm sections and a single base section, the arm sections being angled relative to one another to allow positioning of the first and second clamp members to engage a shaft;
   a locking mechanism positioned proximate the free ends of the first and second clamp members to secure and pull the free ends of the clamp members to one another;

an engagement surface on an interior surface of each flat arm section of the Y-shaped main body of the first and second clamp members; and a torque-assisting extension connected to at least one of either the first clamp member or the second clamp member;

wherein the locking mechanism comprises:
a rod having an outer threaded surface, and
two adjustable members, each having a compatible inner threaded surface, and which bias against the free ends of the clamp members.

7. The shaft clamp of claim 6, wherein the locking mechanism further comprises an adapter for engaging both a free end of the clamp member and at least one of the two adjustable members.

* * * * *